Patented Apr. 28, 1925.

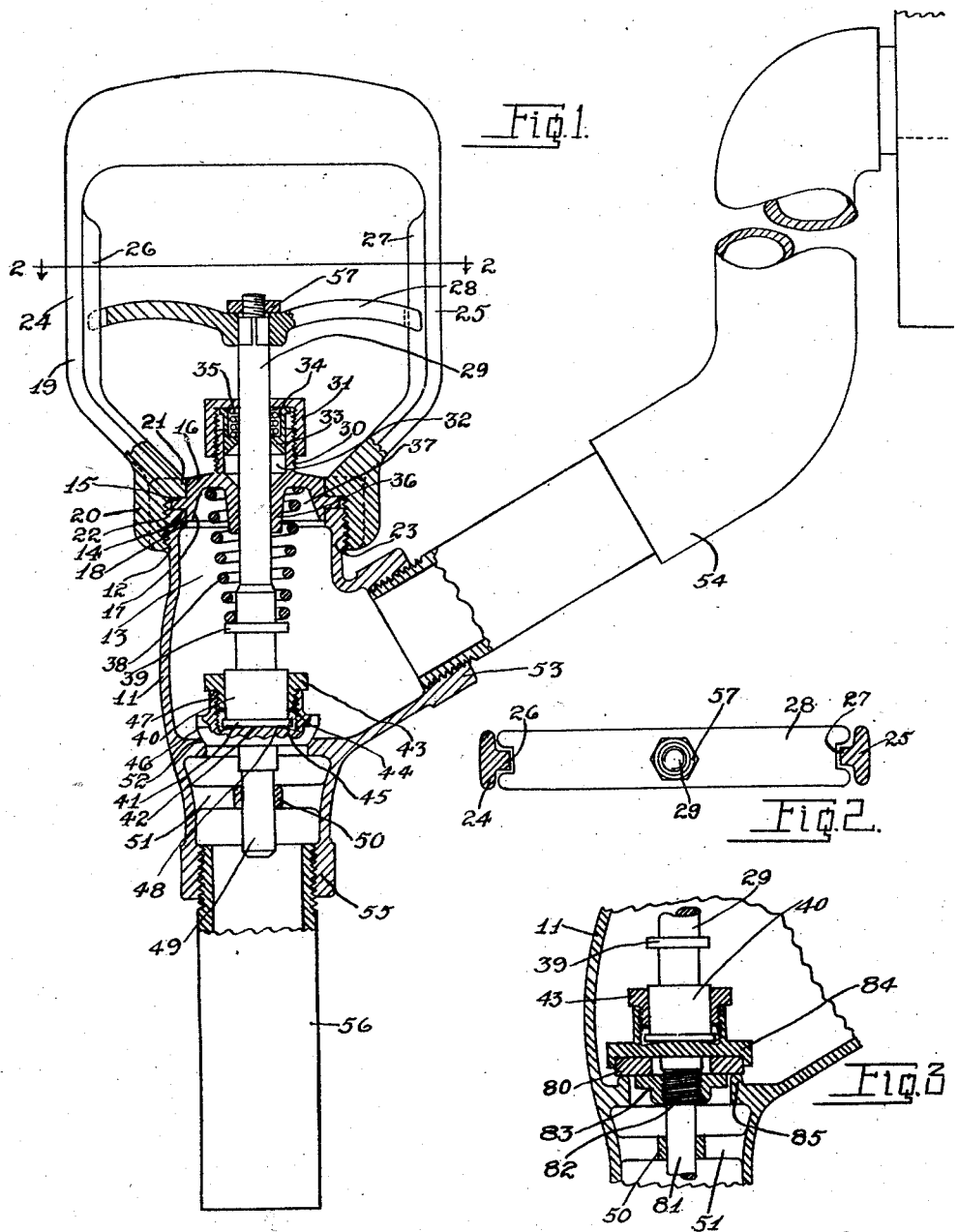

1,535,405

UNITED STATES PATENT OFFICE.

HARRY J. ERNST, OF CINCINNATI, OHIO, ASSIGNOR TO THE D. T. WILLIAMS VALVE COMPANY, OF CINCINNATI, OHIO, A CORPORATION OF OHIO.

VALVE.

Application filed October 8, 1924. Serial No. 742,478.

*To all whom it may concern:*

Be it known that I, HARRY J. ERNST, a citizen of the United States of America, and a resident of Cincinnati, in the county of Hamilton and State of Ohio, have invented new and useful Improvements in a Valve, of which the following is a specification.

An object of my invention is to provide a valve especially adapted for use with automobile filling stations and the like for attachment at the end of a filler hose whereby one attendant can control, at the nozzle or discharge end of such hose, the flow of gasoline and the like to the fuel tanks of automobiles.

Another object of my invention is to provide a device for the purpose stated wherein accidental unseating of the valve is minimized.

Another object of my invention is to provide a valve for the purposes stated wherein the various parts co-operate for attaining the maximum efficiency of the device as a whole.

These and other objects are attained by the means described herein and disclosed in the accompanying drawings, in which:

Fig. 1 is a transverse sectional view of a valve embodying my invention.

Fig. 2 is a sectional view on line 2—2 of Fig. 1, and

Fig. 3 is a sectional view of the modification.

The housing 11 is threaded at its head, as indicated at 12, and is provided about the head of the bore or chamber 13 formed in the housing, with a ledge or seat 14 adapted to receive an annular flange 15 formed on the circumference of the cap 16. A depending flange 17 is formed on the cap and is adapted to enter the chamber 13 and to engage about its outer wall on the inner surface of a ledge 18 formed on the housing adjacent the ledge 14. A handle 19 is provided at its lower end with an annular ring like collar 20 having an inwardly extending flange 21 disposed above internally formed threads 22 carried thereby and adapted to engage with threads 23 formed upon the housing 11 at and exteriorly of the head thereof. The inwardly extending flange 21 of the handle is adapted to engage the annular flange 15 on the cap 16 and to secure the cap 16 upon the housing 11. The arms 24 and 25 of the handle are provided with inwardly extending fins or ribs 26 and 27 respectively and said fins are received between the bifurcated ends of a transversely extending finger piece or member 28 provided for reciprocating the valve stem 29.

The cap 16 is provided with an upwardly projecting extension 30 that is exteriorly threaded and is adapted to receive an internally threaded cover 31 through which cover valve stem 29 reciprocally extends. Packing 32 contained within the extension 30 extends about the valve stem 29 and is engaged at its top by a reciprocally mounted plug or gland 33 provided with an internal recess 34 in which recess is disposed a spring 35 having its opposite ends in abutment upon the cover 31 and the reciprocating gland 33. The packing, the reciprocating gland, the spring 35, and the cover 31 co-operate for at all times effecting a leak proof bearing longitudinally of which the valve stem 29 may be reciprocated.

The cap 16 is provided with a downwardly projecting extension 36 extending into the chamber 13, and forming a bearing longitudinally of which the valve stem 29 may be reciprocated. A recess 37 is developed in the cap 16 intermediate the extension 36 and the external portion of the cap carrying the depending flange 17, said recess serving to receive the larger end of a spiral spring 38.

The valve stem 29 is provided with an annular flange 39 upon which the reduced end of the spring 38 abuts. The lower end of the valve stem 29 has formed on it a cylindrical plug or stem head 40 provided at its lower end with an annular radial flange 41. The lower face 42 of the stem head 40 is a plane surface. A lock nut 43 is carried by the stem head 40 and may be revolved relative to the stem head. The lower sleevelike portion 44 of the lock nut 43 is externally threaded and its end surface 45 is spaced from the upper side of the annular flange 41. A disc valve 46 is provided with an upwardly projecting extension 47 that is internally screw threaded for engagement by the threads formed on the lock nut 43. The disc valve is provided with an internal recess having a globular face 48 that may be engaged by the plane face on the stem head 40. The disc valve carries a depending stem 49 that is received by a bearing 50 supported by webbing 51 extending into the bore or chamber 13 in the walls of the housing. A valve seat 52 extends into the chamber 13, and it is upon said seat that the disc valve is normally retained by the action of the spring 38. Above the valve seat 52 and at one side of the housing there is provided a coupling extension 53 whereby connection may be established with a filler hose or the like 54. The bottom 55 of the housing is provided with suitable means such as threads whereby a suitable nozzle 56 may be attached to the housing.

The disc valve and the lock nut 43 are of lesser diameters than the cap 16 wherefore when the handle 25 is removed from the housing, the entire valve structure may be lifted out of the housing. From this is will be evident that the structure disclosed herein readily lends itself to expeditious assembly and renewal and adjustment of parts. The valve stem 29 is readily assembled and disassociated from the cap 16 and the parts associated therewith by removing the nut 57 carried by the upper end of the valve stem and serving to secure the finger piece 28 upon the valve stem. Upon removal of the nut 57, the valve stem may be moved through the cap 16 thereby disassociating the stem and the cap.

This device as disclosed herein is intended primarily for use with a filler hose of automobile fuel tank filling stations. The viscosity of gasoline is such that it will readily escape through the smallest of crevices. The structure disclosed herein is such that this characteristic of gasoline will be non-effective in permitting escape of gasoline from the housing 11 when the valve is closed.

The valve is adapted to rock on the stem head thereby assuring annular sealing of the valve. This is effected by the action of the spring 38 on the valve stem, while the valve itself is held on its seat by the stem head.

In the form disclosed in Fig. 3, the valve 46 ordinarily of bronze, is displaced by a valve ring or disc 80, of some suitable material such as lead, rubber, etc. The valve guide or stem 81, similar in function to stem 49, is threaded at 82 and carries a lock nut 83 that clamps the ring 80 in the pocket or recess formed in the lower face of the valve holder or disc holder 84, and from which valve holder the stem 81 depends. The valve seat 85 is modified in this structure for providing an upwardly extending annular rounded face for engagement by the valve disc.

I claim:

1. In a device of the class described the combination of a housing having a bore therethrough, a valve seat formed within the housing, coupling connections formed on the housing on opposite sides of the valve seat, a cap forming a closure for one end of the chamber and disposed in substantial alignment with the valve seat, the cap having formed on it an annular flange for annular engagement upon the housing, a handle for mounting upon the housing and provided with an annular recess for the reception of the cap, an annular wall of said annular recess being adapted to retain the annular flange on the cap in engagement upon the housing, a valve stem extending reciprocally through the cap and carrying a valve for engaging the valve seat, and a finger piece positioned adjacent the handle.

2. In a device of the class described the combination of a housing having a bore therethrough, a valve seat formed within the housing, coupling connections formed on the housing on opposite sides of the valve seat, a cap forming a closure for one end of the chamber and disposed in substantial alignment with the valve seat, the cap having formed on it an annular flange for annular engagement upon the housing, a handle for mounting upon the housing and provided with an annular recess for the reception of the cap, the handle comprising parallel arms provided with opposed guide fins, a valve stem extending reciprocally through the cap and carrying a valve for engaging the valve seat, the external portion of the valve stem carrying a finger piece extending between the arms of the handle and having its opposite ends bifurcated for receiving the fins on the handles.

3. In a device of the class described the combination of a housing having a bore therethrough, a valve seat formed on the housing and extending into the bore, a laterally extending coupling connection disposed on one side of the valve seat and forming an inlet port for the housing, the housing, on the opposite side of the valve seat, being developed into a coupling connection and forming an outlet port for the housing, webbing extending into the bore intermediate the valve seat and the second mentioned coupling and providing a bearing extending longitudinally of the bore in the housing, a valve stem received by the bearing for reciprocation longitudinally of its axis and longitudinally of the bore in the housing and extending into the housing disposed beyond the valve seat and the first mentioned coupling connection, the last mentioned end of the housing being provided with an annular seat, a cap extending into the chamber and provided with an annular flange engaging the seat on the housing, a handle for mounting upon the housing provided with an annular recess for the reception of the cap and the flange on the cap, and for clamping the cap upon the housing, the valve stem extending reciprocally through the cap and a finger piece mounted on the stem and disposed beyond the cap.

4. In a device of the class described the combination of a housing having a bore therethrough, a valve seat formed on the housing and extending into the bore, a laterally extending coupling connection disposed on one side of the valve seat and forming an inlet port for the housing, the housing, on the opposite side of the valve seat, being developed into a coupling connection and forming an outlet port for the housing, webbing extending into the bore intermediate the valve seat and the second mentioned coupling and providing a bearing extending longitudinally of the bore in the housing, a valve stem received by the bearing for reciprocation longitudinally of its axis and longitudinally of the bore in the housing and extending into the housing disposed beyond the valve seat and the first mentioned coupling connection, the last mentioned end of the housing being provided with an annular seat, a cap extending into the chamber and provided with an annular flange engaging the seat on the housing, a handle for mounting upon the housing provided with an annular recess for the reception of the cap and the flange on the cap, and for clamping the cap upon the housing and comprising a pair of arms provided with opposed guide fins, the valve stem extending reciprocally through the cap and a finger piece mounted on the stem and disposed beyond the cap, extending between the arms and having its opposite ends bifurcated for the reception of the guide fins on the arms.

5. In a device of the class described the combination of a housing having a bore therethrough and having a laterally extending coupling connection forming an inlet port intermediate the ends of the bore, the housing, at one end of the bore, being developed into an outlet connection, a valve seat extending into the bore intermediate the inlet and outlet connections, an annular seat formed at the second end of the bore, a cap provided with a depending annular flange and with a radially extending annular flange, the said flanges together positioning the cap on the seat on the housing, a handle for mounting upon the second mentioned end of the housing provided with a recess for receiving the radially extending flange and for clamping the flange upon the seat, the cap being provided with a recess disposed interiorly of the housing and forming a spring seat, a valve stem extending reciprocally through the cap, guide means intermediate the valve seat and the outlet connection, the one end of the valve stem extending through the cap, an annular flange formed on the valve stem and constituting a spring seat, a coil spring engaging the spring seats on the valve stem and upon the cap, a cylindrical stem head formed on the second end of the valve stem, the cylindrical stem head having an annular radial flange formed at its lower end, the underface of the said flange being a plane surface, a lock nut receiving the cylindrical head on the valve stem and having its lower end spaced from the annular radial flange and a valve receiving the annular radial flange and engaging the lock nut, the valve having a depending stem reciprocally engaging the guide means intermediate the valve seat and the discharge connection and having a globular surface engaging the plane surface on the cylindrical stem head on the valve stem.

6. In a device of the class described the combination of a housing having a bore therethrough and having a laterally extending coupling connection forming an inlet port intermediate the ends of the bore, the housing, at one end of the bore, being developed into an outlet connection, a valve seat extending into the bore intermediate the inlet and outlet connections, an annular seat formed at the second end of the bore, a cap provided with a depending annular flange and with a radially extending annular flange, the said flanges together positioning the cap on the seat on the housing, a handle for mounting upon the second mentioned end of the housing provided with a recess for receiving the radially extending flange and for clamping the flange upon the seat, the cap being provided with a recess disposed interiorly of the housing and forming a spring seat, a valve stem extending reciprocally through the cap, guide means intermediate the valve seat and the outlet connection, the one end of the valve stem extending through the cap, an annular flange formed on the valve stem and constituting a spring seat, a coil spring engaging the spring seats on the valve stem and upon the cap, a cylindrical stem head formed on the second end of the valve stem, the cylindrical stem head having an annular radial flange formed at its lower end, the under face of the said flange being a plane surface, a lock nut receiving the cylindrical stem head on the valve stem and having its lower end spaced from the annular radial flange and a valve receiving the annular radial flange and engaging the lock nut, the valve having a depending stem reciprocally engaging the guide means intermediate the valve seat and the discharge connection and having a globular surface engaging the plane surface on the cylindrical stem head on the valve stem, the handle comprising arms provided with opposed guide fins, and a finger piece mounted on the first mentioned end of the valve stem, extending between the arms of the handle and having its opposite ends bifurcated for receiving the fins on the handles.

7. In a device of the class described the combination of a housing having a bore therethrough and having a laterally extending coupling connection, forming an inlet port intermediate the ends of the bore, the housing, at one end of the bore, being developed into an outlet connection, a valve seat extending into the bore intermediate the inlet and outlet connections, an annular seat formed at the second end of the bore, a cap provided with a depending annular flange and with a radially extending annular flange, the said flanges together positioning the cap on the seat on the housing, a handle for mounting upon the second mentioned end of the housing provided with a recess for receiving the radially extending flange and for clamping the flange upon the seat, the cap being provided with a recess disposed interiorly of the housing and forming a spring seat, a valve stem extending reciprocally through the cap, guide means intermediate the valve seat and the outlet connection, the one end of the valve stem extending through the cap, an annular flange formed on the valve stem and constituting a spring seat, a coil spring engaging the spring seats on the valve stem and upon the cap, a cylindrical stem head formed on the second end of the valve stem, the cylindrical stem head having an annular radial flange formed at its lower end, the under face of the said flange being a plane surface, a lock nut receiving the cylindrical stem head on the valve stem and having its lower end spaced from the annular radial flange and a valve receiving the annular radial flange and engaging the lock nut, the valve having a depending stem reciprocally engaging the guide means intermediate the valve seat and the discharge connection and having a globular surface engaging the plane surface on the cylindrical stem head on the valve stem, the handle comprising arms provided with opposed guide fins, a finger piece mounted on the first mentioned end of the valve stem, extending between the arms of the handle and having its opposite ends bifurcated for receiving the fins on the handles, the cap having a hollow upwardly extending projection, packing disposed within the said projection and through which packing the valve stem reciprocally extends, a reciprocally mounted plug received within the hollow extension on the cap and provided with a central recess, a coil spring received within the recess in the plug and having its one end in abutment upon the plug and a cover through which the valve stem reciprocally extends engaging the extension on the cap, and forming an abutment for the spring received within the recess in the plug and adapted to engage the plug for retaining the plug in frictional contact upon the packing surrounding the valve stem.

In testimony whereof, I have hereunto subscribed my name this 2nd day of October, 1924.

HARRY J. ERNST.